United States Patent [19]

Hiraike

[11] 4,453,816
[45] Jun. 12, 1984

[54] METHOD AND MEANS FOR CONTROLLING THE APERTURE BLADES OF A CAMERA THROUGH PULSE MOTORS

[75] Inventor: Fumiaki Hiraike, Hachioji, Japan

[73] Assignee: Konishiroku Photo Industry Co., Ltd., Tokyo, Japan

[21] Appl. No.: 445,286

[22] Filed: Nov. 29, 1982

Related U.S. Application Data

[63] Continuation-in-part of Ser. No. 258,658, Apr. 29, 1981.

[30] Foreign Application Priority Data

Apr. 30, 1980 [JP] Japan ................................. 55-57319

[51] Int. Cl.³ .............................................. G03B 9/02
[52] U.S. Cl. .................................... 354/271.1; 354/452
[58] Field of Search ................... 354/42, 43, 44, 270, 354/271

[56] References Cited

U.S. PATENT DOCUMENTS

| 3,997,905 | 12/1976 | Iwata et al. | 354/44 |
| 4,016,574 | 4/1977 | Iwata et al. | 354/44 |
| 4,041,512 | 8/1977 | Iwata et al. | 354/44 |
| 4,074,289 | 2/1978 | Nobusawa | 354/44 |
| 4,079,390 | 3/1978 | Iwata et al. | 354/44 |
| 4,344,678 | 8/1982 | Mizokami | 354/271 |
| 4,367,931 | 1/1983 | Kawai et al. | 354/271 |

Primary Examiner—Russell E. Adams
Attorney, Agent, or Firm—Jordan B. Bierman; Linda Bierman; C. Cornell Remsen, Jr.

[57] ABSTRACT

The invention is directed to an improved method and apparatus for controlling the aperture blades of a camera in which the aperture stop-down position is controlled by the number of pulses applied to pulse motors. In the present case, the unit-pulse numbers which determine the aperture stop-down position are split into at least two groups, one of which is a multiple of the other, and the blades are moved into the desired position by applying both groups of pulses to the pulse motors.

9 Claims, 9 Drawing Figures

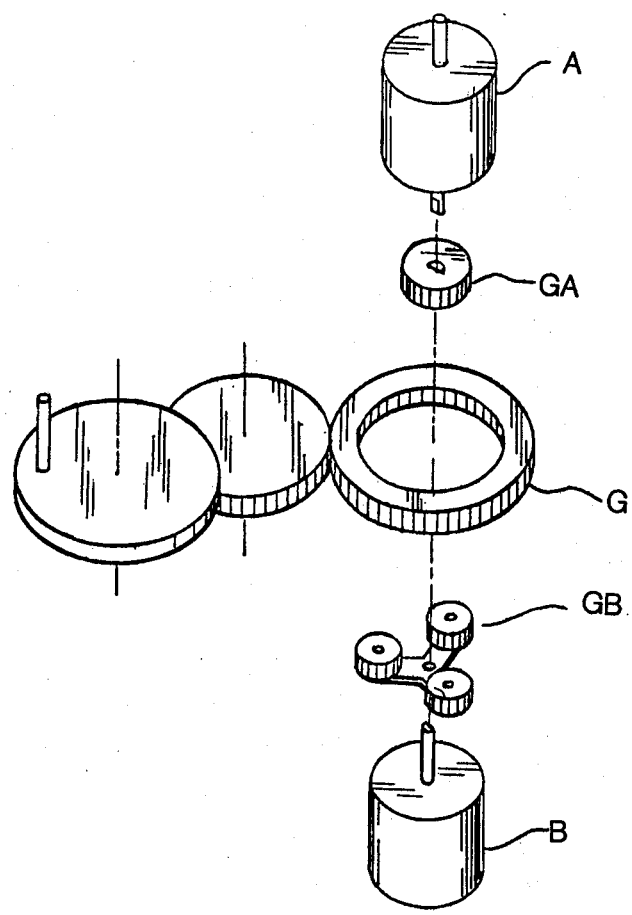

METHOD AND MEANS FOR CONTROLLING THE APERTURE BLADES OF A CAMERA THROUGH PULSE MOTORS

This application is a continuation-in-part of application Ser. No. 258,658 filed Apr. 29, 1981 which claimed the priority of Japanese Patent Application No. 57319/1980 filed on Apr. 30, 1980.

BACKGROUND OF THE INVENTION

1. Field of the Invention

The present invention relates to an improvement in the methods means for controlling an aperture of a camera, wherein the aperture stop-down position is controlled by the number of applied pulses.

2. Description of the Prior Art

Generally small-sized cameras have so far adopted an exposure control systems such as a programmed system wherein a shutter speed and an aperture value are determined, and an exposure is controlled by film speed (e.g., ASA) of a photofilm loaded in a camera and the photometric result of the luminance of a photosubject; a shutter-speed priority aperture system wherein an aperture value is determined and controlled by film speed (e.g., ASA) of a photofilm, a photometric result and also a pre-set shutter speed; and a system wherein an aperture value is manually determined and controlled taking priority of a shutter speed. Such methods for controlling aperture blades have been those that an aperture stop-down detector is attached to an aperture control lever motivating aperture blades to operate, and either counted value obtained by the use of an aperture stop-down detector comprising a combination of a pulse generator and a counter, or a resistance value obtained by the use of an aperture stop-down detector comprising a resistor is compared with either preset value of counts or preset value of resistance correspondingly; the aperture control lever is stopped by a stopper mechanism at the position where the both values compared become equivalent to each other, and thus a stop-down operation can be controlled. In this method, a time lag between a detection of an aperture stop-down value obtainable in the form of a counted value or a resistance value and a stop of an aperture control lever has occurred, and this has been the cause of deterioration in aperture accuracy. Accordingly, one cannot decrease the aperture closing-down speed of aperture blades to secure an accurate aperture control.

As for the other methods for controlling aperture blade operation to secure the accuracy thereof, there are known, for example, a feed-back control method wherein a DC motor is used and a method using a pulse motor. In case of the former, the control circuits and mechanism become complicated. On the other hand, in case of the latter, the mechanism thereof becomes simpler and more accurate, but the number of pulses per hour to which a pulse motor responds is limited; therefore it cannot be used for a rapid aperture control.

The present invention relates to an improvement of aperture control using a pulse motor or the like. A description will be made at first particularly with reference to the aperture control, wherein a pulse motor is used. Nowadays, the self-electromotive frequency of normal type of pulse motor is up to the order of 1,000 pps (pulses per second). For example, if F1 is fixed as the fundamental and an aperture control at F22+0.5 EV is done for every 0.1 EV as a unit, the aperture steps between F1 and F22 are nine steps of F1.4, 2, 2.8, 4, 5.6, 8, 11, 16 and 22, i.e., for 9 EV that would be 90 pulses, and for 0.5 EV it would be 5 pulses, therefore the total pulse numbers would be 95. Now, if an aperture control of F22+0.5 EV, wherein F1 is fixed as the fundamental, is tried within the time of 50 ms (0.05 sec.), the equation, $95 \div 0.05 = 1,900$ pps would be formulated, therefore it cannot be feasible with the use of a normal type pulse motor. This fact means that any normal type pulse motor cannot control an aperture operation by every 0.1 EV as a unit.

SUMMARY OF THE INVENTION

Paying attention to the fact that a normal type pulse motor has a self-electromotive frequency of the order of 1,000 pps irrespective of the angle of leads per pulse, the present invention has been made aiming to perform a rapid and highly efficient aperture control, and in the methods for controlling an aperture wherein an amount of movement of a set of aperture blades from the starting position of stopping down operation to the aperture stop-down position is determined as the number of unit pulses, the present invention is to provide a method and means for controlling an aperture characterized in splitting the aforesaid unit-pulse numbers into at least two modes, one of which is a set of the unit-pulse numbers and another of which is the unit-pulse numbers not exceeding the unit-pulse numbers of the aforesaid set, and in counting the pulse numbers of the each mode respectively, and in determining an aperture stop-down position by the said two modes.

BRIEF DESCRIPTION OF THE DRAWINGS

FIG. 2 is an exploded perspective view showing the power transmission mechanism from the pulse motors A and B to the output gear G;

DETAILED DESCRIPTION OF THE PREFERRED EMBODIMENT

Figure 1:
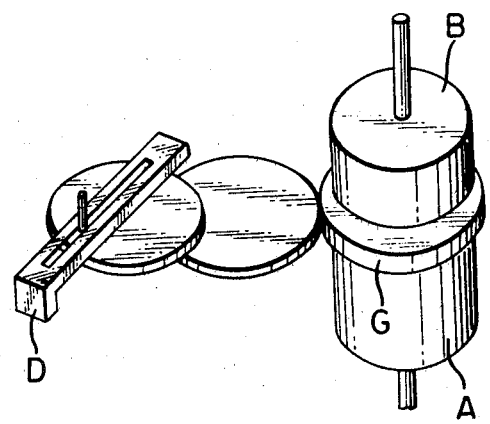
FIG. 1 is a perspective view showing an embodiment of the present invention in which two motors are used.

The embodied examples of the present invention will be described with reference to the figures thereof. The present invention uses a plurality of pulse motors or a pulse motor having a plurality of its movements, of which the former will be described first. FIG. 1 shows an embodiment of the present invention in which two motors are used. A and B are pulse motors and G is an output gear. D is an aperture blade driving member. FIG. 2 shows the power transmission mechanism from the pulse motors A and B to the output gear G which has m teeth. A gear GA driven by the pulse motor A has s teeth and a gear GB driven by the pulse motor B has l teeth. Therefore if pulse motor A rotates one revolution, the gear G rotates s/m revolution and if pulse motor B rotates one revolution, the gear G rotates $(m+s)/m$ revolution. The pulse motor A has the angle of lead (angle of revolution) per pulse number at which angle the gear G rotates $\alpha°$ and the pulse motor B has the angle os lead per pulse number at which angle the gear G rotates $n\alpha°$ (n represents a value of positive integers). Now, the mechanism of the pulse motor A is set so that the angle of lead per pulse can be corresponded to 0.1 EV.

When the number of unit-pulses in a set is 10, the aforesaid 95 unit-pulses are split into and counted by two modes which are 9 sets of 10 unit-pulses, and 5 unit-pulses and 5 unit-pulses are fed to the pulse motor A and 9 sets of 10 unit-pulses are fed to the pulse motor B. An aperture mechanism of the invention is constructed so as to use a differential gear and to operate according to the angle of lead totaling both angles of lead of the pulse motor A and the pulse motor B.

Accordingly, the equation, $5 \times a° + 9 \times (10a°) = 95a°$ would be formulated and then the aperture is stopped down at the position corresponding to F22+0.5 EV by giving $95a°$ revolution. The time required for performing the aperture control would vary under the operational conditions of the pulse motors, A and B as described hereafter, and normally the aperture is stopped down in the position within 14 ms of time. In other words, in the case where the pulses are split into and counted by the two modes and the aperture is then stopped down as in the case of the invention, the high accuracy of an aperture stop-down is secured by the use of a pulse motor and, in addition, the rapidity of a stop-down action consequently takes place. Further, in the aforegiven example, in the case where the pulse motor B is operated first by applying 9 sets of the unit pulses, and successively 5 units of pulses are applied to the pulse motor A so that an aperture can be stopped down in position, a set of the aperture blades is rapidly stopped down at a position by the proper stop-down position and then is changed to the slower stop-down speed, and therefore there will be almost no binding or the like of the aperture blades. As described above, the self-electromotive frequency of a normal type pulse motor is at the order of 1,000 pps, however, in the case where the pulses are split into two modes by the use of the pulse motors, A and B, it is possible to perform a high speed aperture control even when using a pulse motor having low self-electromotive frequency. Also, it is possible to use a rotary solenoid, etc. having a far lower self-electromotive frequency than that of the pulse motors.

Figure 3A:
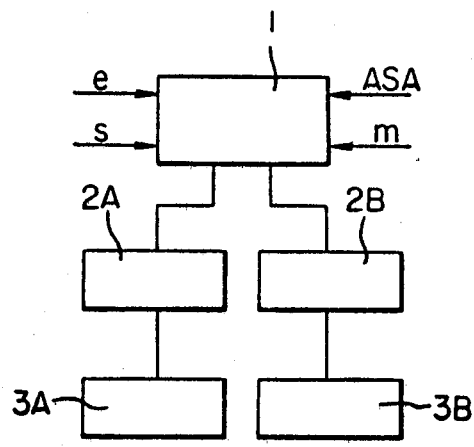
FIGS. 3(A) and (B) are the block diagrams illustrating the present invention.
Figure 3B:
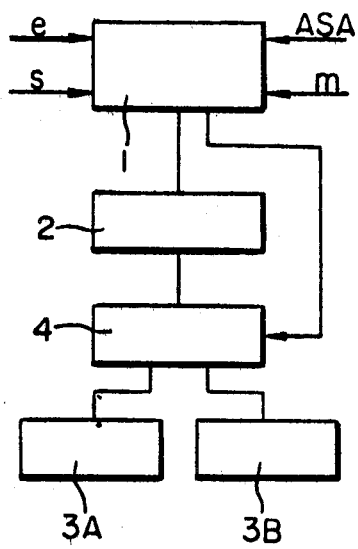
Figure 4:
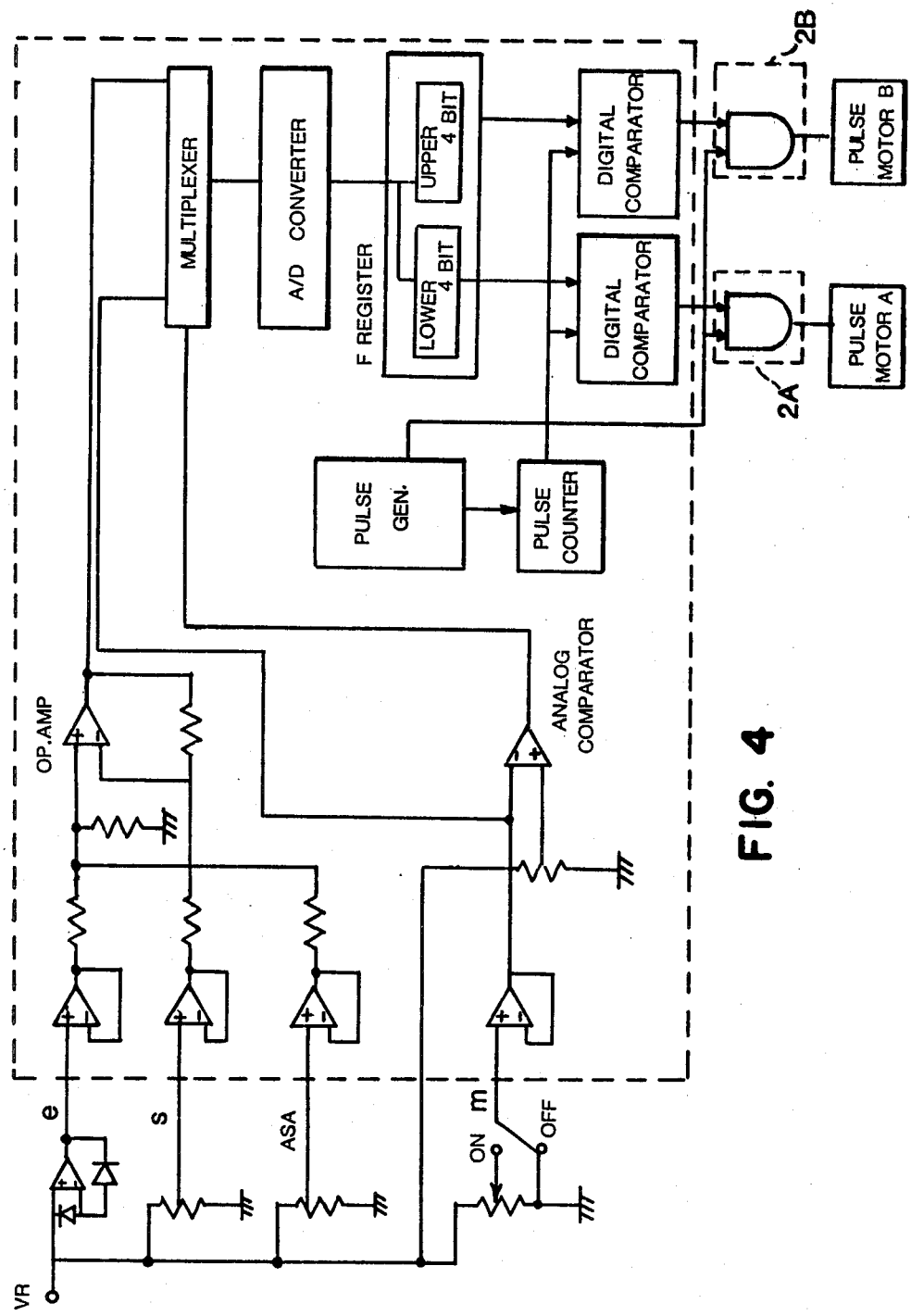
FIG. 4 is a detailed circuit diagram of FIG. 3(A)

FIG. 3(A) and FIG. 3(B) are block diagrams showing the aperture control methods of the invention. And FIG. 4 is a detailed diagram of FIG. 3(A). FIG. 4 illustrates that the most suitable aperture value (e.g., F8+0.7 EV) is determined by input information such as film speed (e.g., ASA), photometric value e, shutter speed s or manual aperture setting m. Analog information such as e,s,ASA passes through an operational amplifier OP.AMP and thus aperture value for auto exposure is determined. Manual aperture setting information m is fed to a multiplexer. The multiplexer feeds the aperture value for auto exposure at the time when the manual aperture setting, information m represents no manual aperture setting and the multiplexer feeds the manual aperture value which is fed through the analog comparator at the time when the manual aperture seting information m represents manual aperture setting. Aperture value for auto exposure or aperture value set manually is fed to A/D converter and converted into a digital value. The digital value is registered in an aperture F REGISTER comprising upper 4 bit and lower 4 bit. Two digital comparators compare the pulse counter with upper 4 bit sections and with lower 4 bit respectively. Pulses from a pulse generator are fed to pulse motors A and B through AND gates 2A and 2B until the content of the digital comparators become consistent with content of upper 4 bit. The thus determined aperture value is converted into the corresponding pulse number (67 pulses in this example) so that one pulse can be generated for every 0.1 EV as described before.

The pulse motor A (3A in the figure), which revolves for an angle $a°$ per pulse at which the gear G rotates, is led by the pulses of $a$ (7 pulses) and the pulse motor B (3B in the figure) which revolves for an angle $n°$ per pulse at which angle the gear G rotates $n$ (10) is led by the pulses of $b$ (6 pulses), that is, the total angle of lead of the gear G would be $(b \times n + a°)$ (67 in this example) and consequently the most suitable aperture value is obtained.

FIG. 3(B) is a block diagram of another aperture controlling method wherein two ways of controlling, that is, series and parallel in a time series are available. In case of a series control in a time series, the number of pulses b (6 pulses in the previous example) which are supplied to the pulse motor B (3B in the figure) from CPU 1 are first generated. This pulse enters the pulse motor drive 2 and is amplified and is switched so that it enters the pulse motor B (3B in the figure) with the aid of an AB switching part 4. After the pulse motor B (3B in the figure) operates, the number of pulses a (7 pulses in the example) to be supplied from CPU 1 to the pulse motor A (3A in the figure) are generated and then they enter the pulse motor drive 2 and are amplified and with the aid of the AB switching 4; the amplified pulses enter the pulse motor A (3A in the figure) and are driven to cause the best stop value. In case of a parallel control in a time series, likewise, the smaller number of pulses (6 pulses in the example) out of a or b are first generated from CPU 1. The pulses are amplified by the pulse motor drive 2 and are supplied to both pulse motors 3A and 3B through the AB switching part 4 and both pulse motors 3A and 3B are driven according to these pulses. Next, the difference between the pulse number a and the pulse number b $(a-b=1$ pulse in the example) is generated from CPU 1 and the difference is supplied to the pulse motor A (3A in the figure) through the pulse motor drive 2 with the aid of the AB switching part 4 and the pulse motor A (3A in the figure) advances by the difference (1 pulse in the example) of the number of pulses causing the best stop value. In this description, the rotating direction of the pulse motor is one direction (the direction to increase) but in case of both directions, it is not necessary to limit to the smaller number out of a and b described above.

Figure 5A:
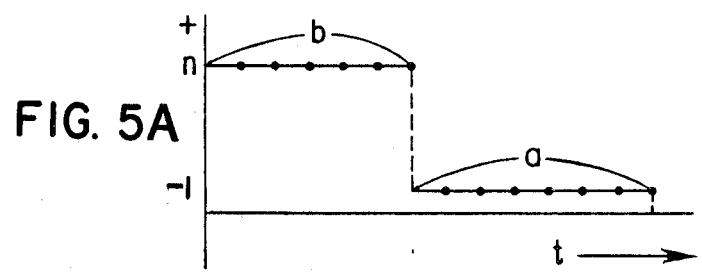
FIGS 5(A) through (D) are graphs showing the operation of pulse motors A and B of the present invention viewed in a time series.
Figure 5B:
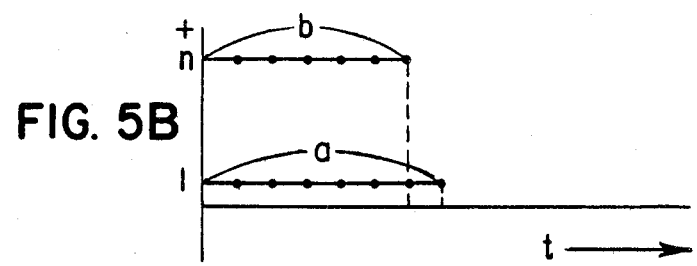
Figure 5C:
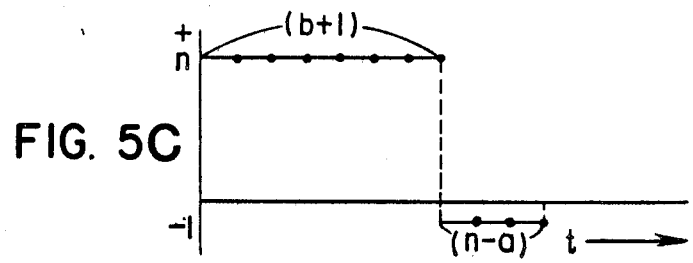
Figure 5D:
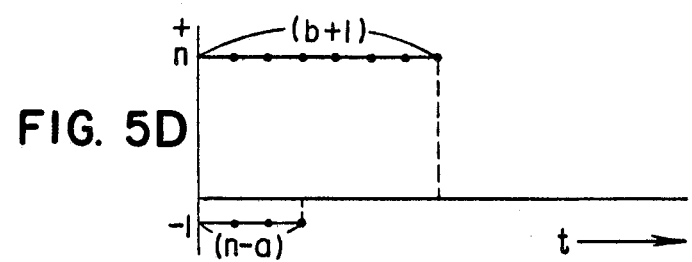

FIGS. 5(A)–5(C) the operational embodiment of the pulse motors A and B viewed in a time series manner, and in FIG. 5(A), the pulse motor B is rotated by the amount of b pulses and immediately after the completion of b pulses, the pulse motor A is rotated by the amount of a pulses in the same direction (the direction to be added). In FIG. 5(B), the pulse motors A and B start to rotate in the same direction (the direction to be added) at the same time by the amount of a and b pulses respectively. In FIG. 5(C), the pulse motor B is rotated by the amount of (b+1) pulses and then the pulse motor A is rotated by the amount of (n−a) pulses in the opposite direction (the direction to be deducted). Further, in FIG. 5(C) the pulse motors A and B start to rotate at the same time in the opposite direction (the direction to be deducted) by the amount of (n−a) and (b+1) pulses respectively. It is most effective for the CPU in FIG. 3(B) to have a changeable structure and program that makes it the operational embodiment of FIGS. 5(A) and 5(B) in the case of a<(n/2) and also makes it the operational embodiment of FIGS. 5(C) and 5(D) in the case of a>(n/2).

In all the cases in the description mentioned above, n is equal to 10 but the present invention shall never be limited to this. Further, the description is made under the condition of the usage of two pulse motors A and B but in the case where a higher speed is desired, it is possible to make it a three step mode and to drive three pulse motors and to fix the stopping down position. Further, when a pulse motor that has two input parts C and D and rotates by $(P \times \alpha)°$ when receiving P pulses from C input part and also rotates by $(g \times n\alpha)°$ in the same direction when receiving g pulses from D input part is used, it is possible to embody the above-mentioned invention with only one pulse motor.

Furthermore in the aforesaid description, the example has been given only for the case to stop down from the maximum aperture F1. In a single lens reflex camera, stopping down from the side of maximum aperture is convenient from the view point of the brightness of the finder but the present invention is not naturally limited to this and the case of operating from the minimum aperture to the maximum aperture is also included in the present invention.

What is claimed is:

1. A method for controlling the movement of a set of aperture blades in the camera from the starting position of a stopping down operation to the aperture stop-down position by a predetermined number of unit pulses, which includes the steps of dividing the number of required unit pulses into two groups, one of which is a multiple of the other, and moving said blades into the desired position by applying the said two groups of pulses.

2. Method according to claim 1 in which said two groups of pulses are aplied in sequence.

3. Method according to claim 1 in which said two groups of pulses are applied simultaneously.

4. Method according to claims 2 in which the number of required pulses is additive of the two groups.

5. Method according to claims 2 in which the total number of required pulses is obtained by subtracting the single group from the multiple group.

6. Method according to claim 3, in which the number of required pulses is additive of the two groups.

7. Method according to claim 3, in which the total number of required pulses is obtained by substracting the single group from the multiple group.

8. Apparatus for controlling the movement of a set of aperture blades in a camera comprising a pair of pulse-responsive stepping members, one of which is adapted to step the blades at a speed n times that of the other, means determining the optimum aperture setting, means determining the number of pulses required to attain the said optimum setting, means dividing said determined number of pulses into two groups of which the greater number is n times the smaller number, and means applying the pulses of the larger number group to said one stepping member and the pulses of smaller number group to the other stepping member, and means controlling the movement of said blades by the combined action of said two stepping members.

9. Apparatus according to claim 8, in which said stepping members are pulse motors.

* * * * *